US007777109B2

(12) United States Patent
Saragosa

(10) Patent No.: US 7,777,109 B2

(45) Date of Patent: Aug. 17, 2010

(54) PERCUSSION INSTRUMENT WITH HELICAL COIL AND RESONANT CHAMBER

(75) Inventor: William A. Saragosa, Obere Stadt 77, Weilheim (DE) D-82362

(73) Assignee: William A. Saragosa, Weilheim (DE)

( * ) Notice: Subject to any disclaimer, the term of this patent is extended or adjusted under 35 U.S.C. 154(b) by 0 days.

(21) Appl. No.: 12/459,786

(22) Filed: Jul. 8, 2009

(65) Prior Publication Data

US 2010/0005945 A1 Jan. 14, 2010

Related U.S. Application Data

(60) Provisional application No. 61/134,751, filed on Jul. 14, 2008.

(51) Int. Cl.
*G01D 13/08* (2006.01)

(52) U.S. Cl. ........................................................ 84/302

(58) Field of Classification Search ............ 84/402–410
See application file for complete search history.

(56) References Cited

U.S. PATENT DOCUMENTS 2,571,178 A * 10/1951 Allen ...................... 340/398.1

* cited by examiner

*Primary Examiner*—Kimberly R Lockett
(74) *Attorney, Agent, or Firm*—Mark Manley

(57) ABSTRACT

A hand held percussion musical instrument including: a thin walled resonance chamber and a first rigid coil having a first end attached to the resonance chamber such as by welding. The first rigid coil has a length perpendicular to the surface of the resonance chamber and; the first coil includes a plurality of individual wire wraps each wrap spaced from adjacent wraps. A second end of the first coil is spaced from the resonance chamber such that striking the first coil produces first musical tones amplified by said resonance chamber. The resonance chamber can be held between the user's thumb and middle finger such that the coil can be struck or filtered by the user's index finger during play.

20 Claims, 7 Drawing Sheets

PERCUSSION INSTRUMENT WITH HELICAL COIL AND RESONANT CHAMBER

CROSS REFERENCE TO RELATED APPLICATIONS

Provisional Application for Patent No. 61/134,751, filed Jul. 14, 2008, with the title, "Percussion Instrument with Helical Coil and Resonant Chamber" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a musical instrument.

2. Background Information

Percussion instruments are among the oldest known to man. Various drums and percussion instruments have been known for centuries. One percussion instrument is the birembao, a traditional Afro-Brazilian instrument. It consists of a bow which tenses a string or wire and a resonant shell typically made from a gourd. The instrument is strenuous and difficult to play but will produce an interesting 'wha-wha' effect when played. It is cumbersome to transport, and fragile.

Another prior art instrument is the so called 'thunder tube' which uses a limp tension spring attached to a resonator tube. The instrument produces a loud and sustained sound effect that is similar to thunder; but it can not really be controlled to produce distinct rhythms. It also does not have a wide range of possible dynamics, which is very important to the full expression of the musical art.

As will be seen in the subsequent description of the preferred embodiments of the present invention, the present invention overcomes shortcomings of prior art.

SUMMARY OF THE INVENTION

The present invention in the preferred embodiment is a hand held portable musical instrument capable of producing new and novel sounds and music the instrument including:

a thin walled resonance chamber and a spring like first rigid coil having a first end attached to the resonance chamber such as by welding.

The first rigid coil has a length perpendicular to the surface of the resonance chamber and; the first coil includes a plurality of individual wire wraps each wrap spaced from adjacent wraps. A second end of the first coil is spaced from the resonance chamber such that striking the first coil produces first musical tones amplified by said resonance chamber. The resonance chamber can be held between the user's thumb and middle finger such that the coil can be struck or dampened by the user's index finger during play.

DESCRIPTION OF THE PREFERRED EMBODIMENTS

Figure 1:
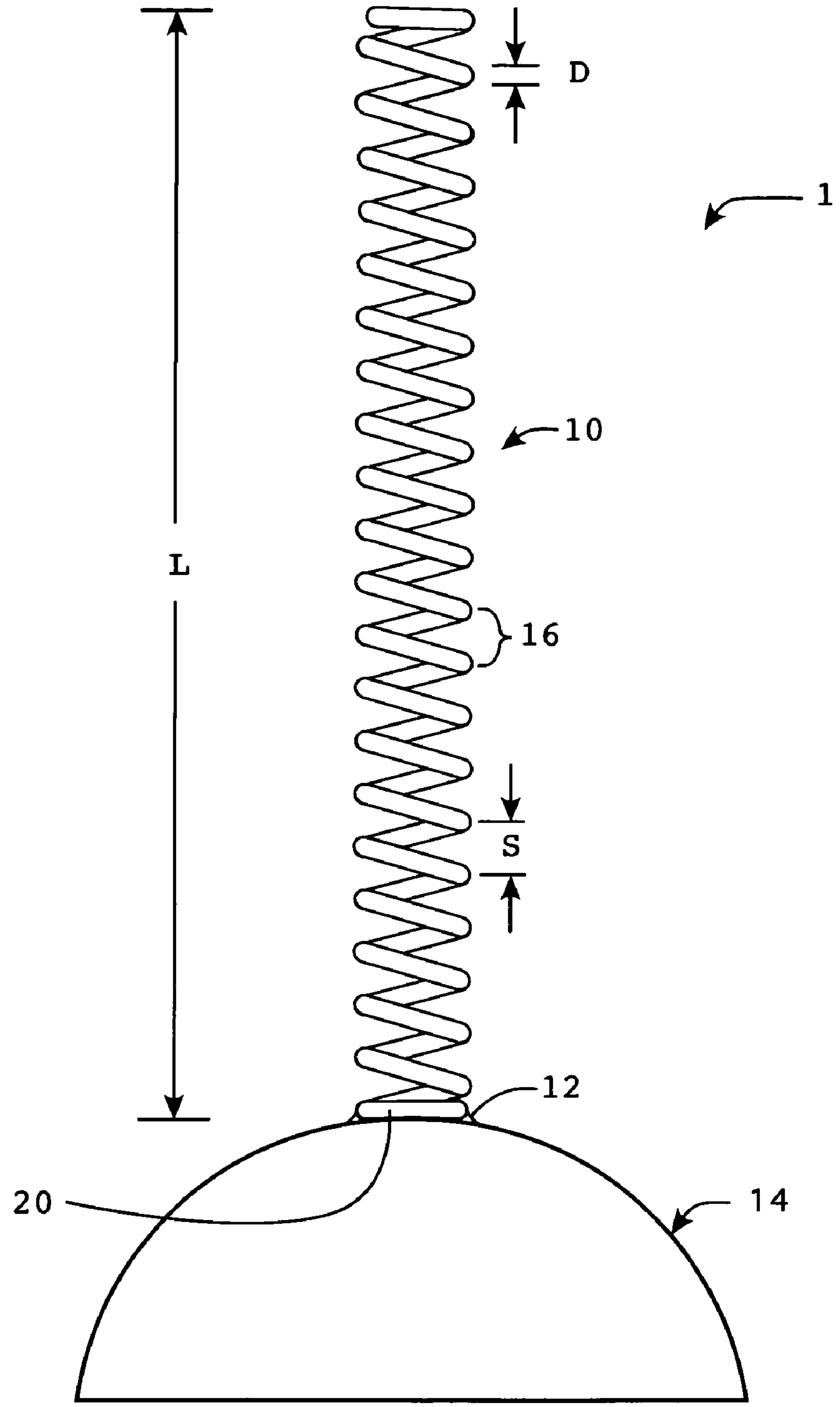
FIG. 1 shows a view of a first embodiment.

Referring to FIG. 1, the preferred embodiment of the present invention, a simple portable musical instrument 1 comprises a heliocoidal member such as a free standing compression spring or semi-rigid metallic coil spring 10, securely attached 12 to a shell resonator 14 sized to fit comfortably in a user's hand allowing for highly ergonomic control. The coil 10 is flexible enough so as to produce audible vibrations when struck, rubbed, or bowed. The coil 10 is rigid enough to stand on its own and to not vibrate or produce sound when moved or picked up in preparation for use. The instrument 1 is portable so that a musician can transport it in a small bag containing other instruments and accessories without difficulty or damage to itself nor other instruments in the bag. As can be seen the coil 10 has a plurality of individual wraps 16 of wire. The coil 10 is mounted such that its length extends approximately perpendicular to the surface of the thin walled semi-spherical shell resonator 14. The shell could have other shapes such as conical or cylindrical that could be used to create a hollow resonant body. The coil 10 produces sound when struck or rubbed with fingers or by a striker. The specific acoustical qualities of the coil 10 are amplified and filtered by the resonator body 14. There is a spacing S between wraps and there is a length L of the coil 10 as well as a diameter D of the wire. Each element spacing S, length L and diameter D will effect the musical properties of the instrument 1. The coil 10 has ground flat ends 20 and can be attached 12 using welding, brazing or adhesives for example. It is important that the coil 10 be securely attached to the surface of the shell resonator 14 to prevent 'buzzing' that would occur if the end 20 is allowed to vibrate against the resonator 14, attachment can be by welding or brazing or by strong adhesive. Also the spacing S must be sufficient that the individual wraps 16 will not touch each other as this would also produce a buzz and deaden the overall musical effect. Also the spacing S can be important to enable the production of sound by dragging a striker 120 (FIG. 4) length wise over the coil wraps 16. The length L of the coil 10 determines the specific resonance or note of the instrument 1.

Figure 2:
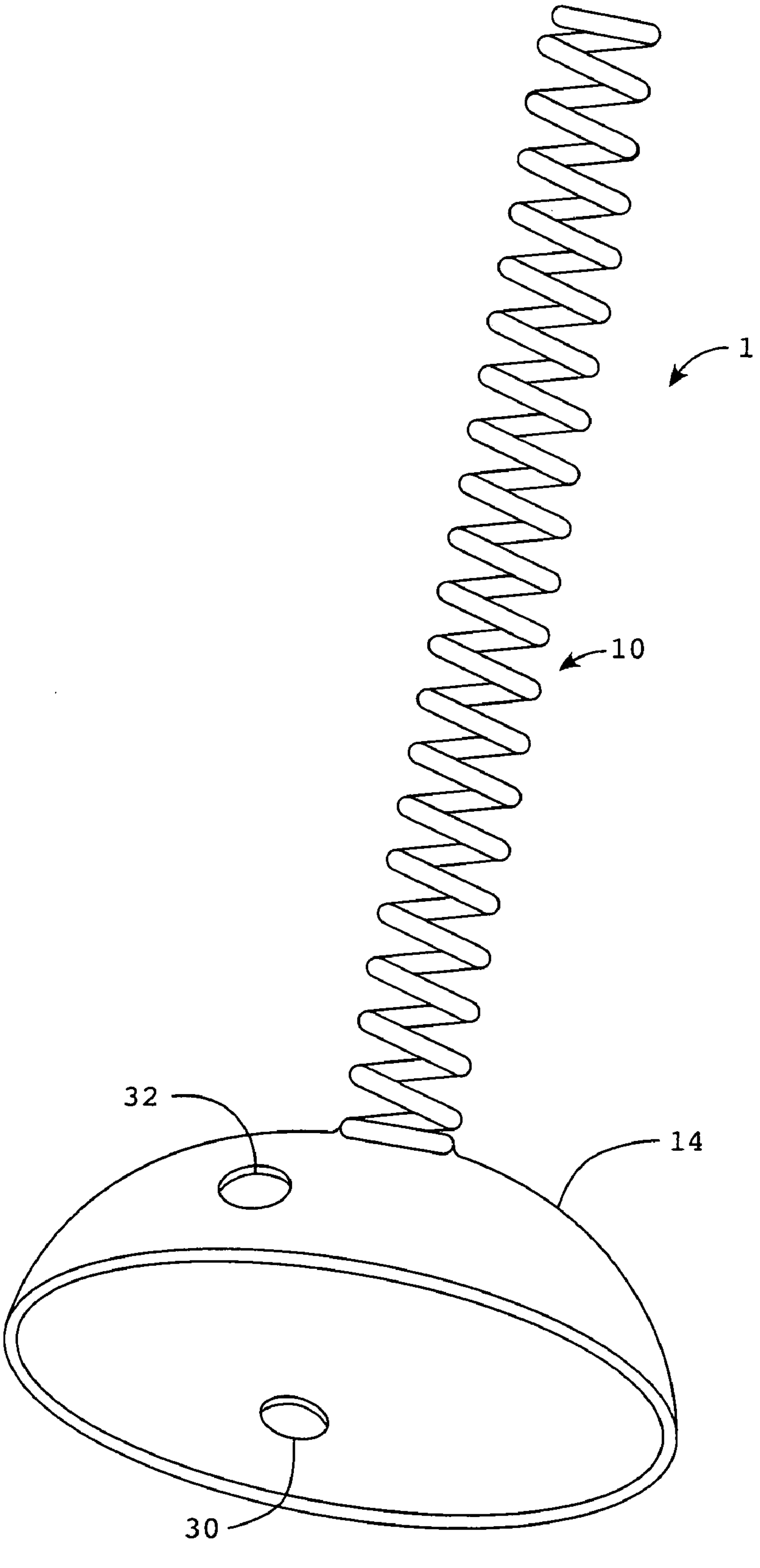
FIG. 2 shows a second view of the first embodiment.

The resonant shell chamber 14 is a size and shape to fit comfortably in the hand of a player. FIG. 2 shows that the thin walled resonator 14 can be hollow and two holes 30, 32 can be cut into the resonator shell 14. The holes 30,32 act as finger holds since the instrument 1 is held by hand. Dimples (FIG. 6), could be used instead of holes for an enhanced grip.

Figure 3:
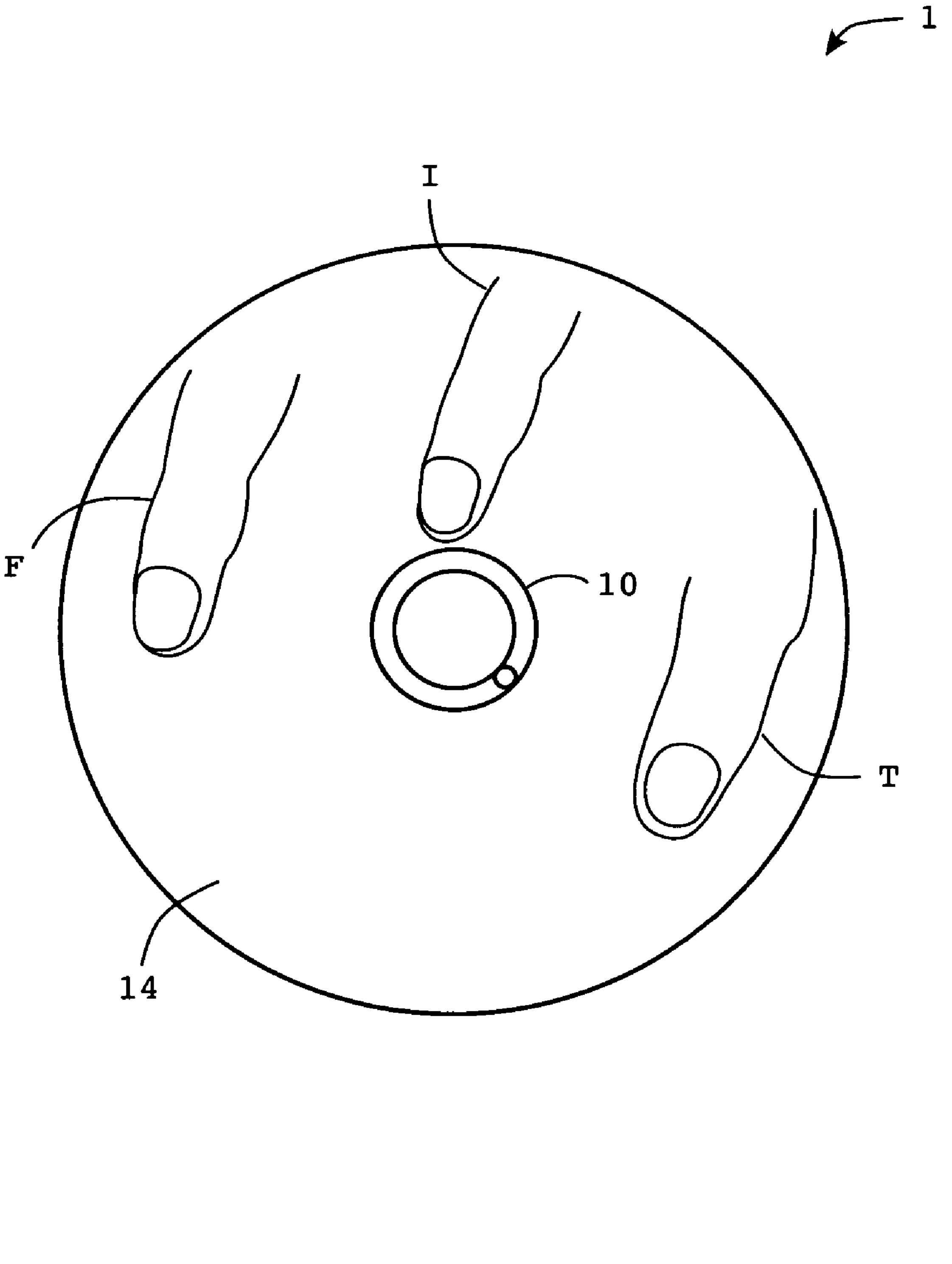
FIG. 3 shows a plan view of the instrument in use.

FIG. 3 shows a view looking down on the instrument 1 with a users fingers shown a thumb T engages one hole 32, an index finger I is poised by the spring 10, and a second finger (opposed to the thumb T holds the other hole 30. Held in this way the Index finger I is poised to touch the spring 10 and can thus create a dampening pressure that filters vibrations and sound of the coil 10. The instrument 1 may be lifted and supported with a minimum of effort, with just the thumb T and middle finger providing support, the index finger I is not supporting the instrument 1 and is thus free to either strike or dampen and filter the spring coil 10. Thus the user can actually hold the instrument 1 and still play with both hands. The instrument 1 could even be held with a single finger or thumb inserted in a hole 30,32.

Figure 4:
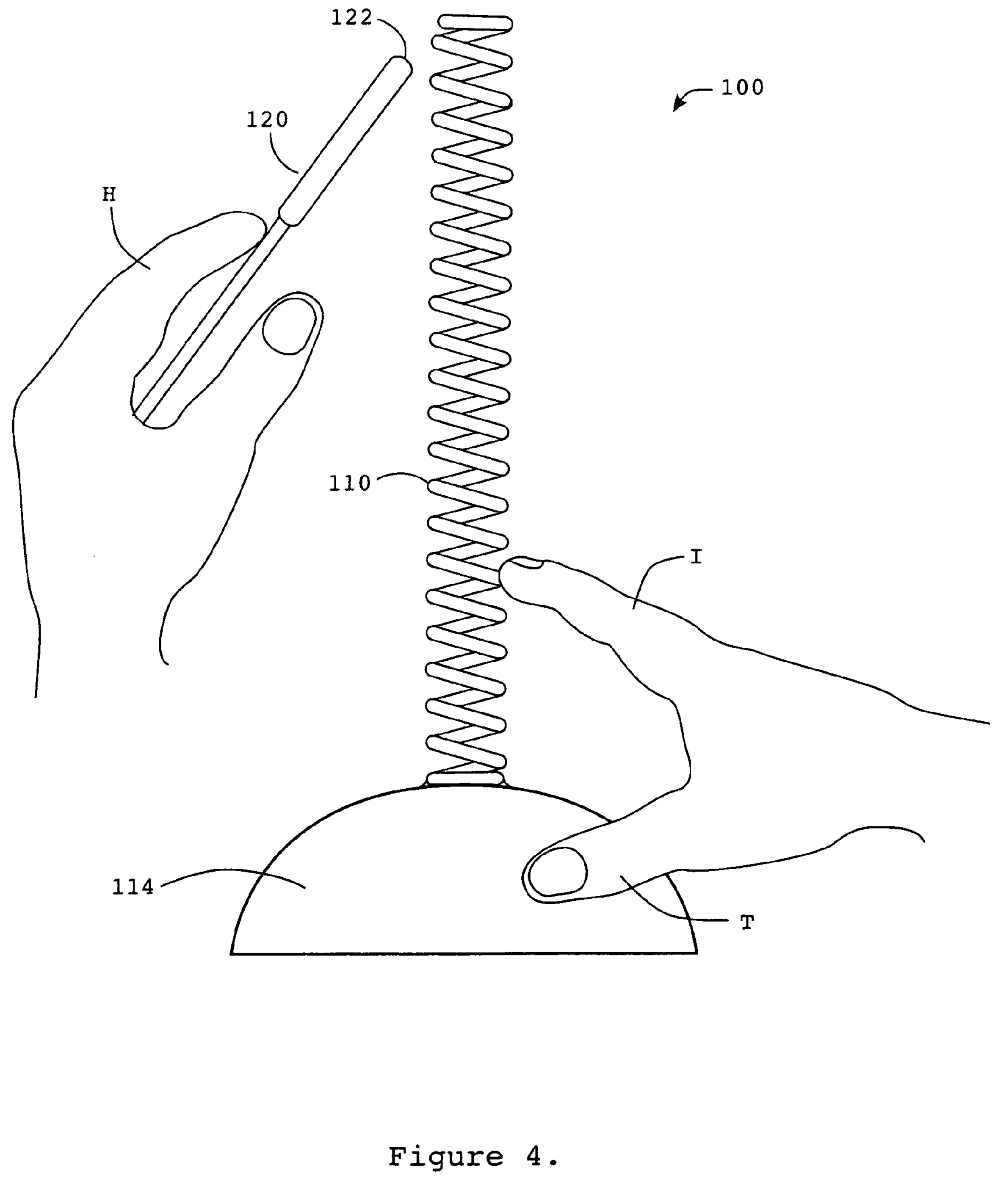
FIG. 4 shows a view of a second embodiment in use.

FIG. 4 shows a second embodiment 100 in use. The thumb T and opposing finger (not shown) hold the resonant chamber 114. The coil 110 is shorter than shown in the embodiment of FIG. 1 and the index finger I is shown in the coil dampening position. A second hand H is shown holding a striker 120 that can have a hard end or a padded end 122. Although the instrument 100 is typically struck it may also be used as a striker and in this manner of use will add dynamic additional sound to another percussion instrument being struck. For example, the instrument 100 could be used as a specialized percussion striking mallet. It can also be used as an intermediate striking surface, being laid across a drum head and struck with a drum stick for a unique effect.

Figure 5:
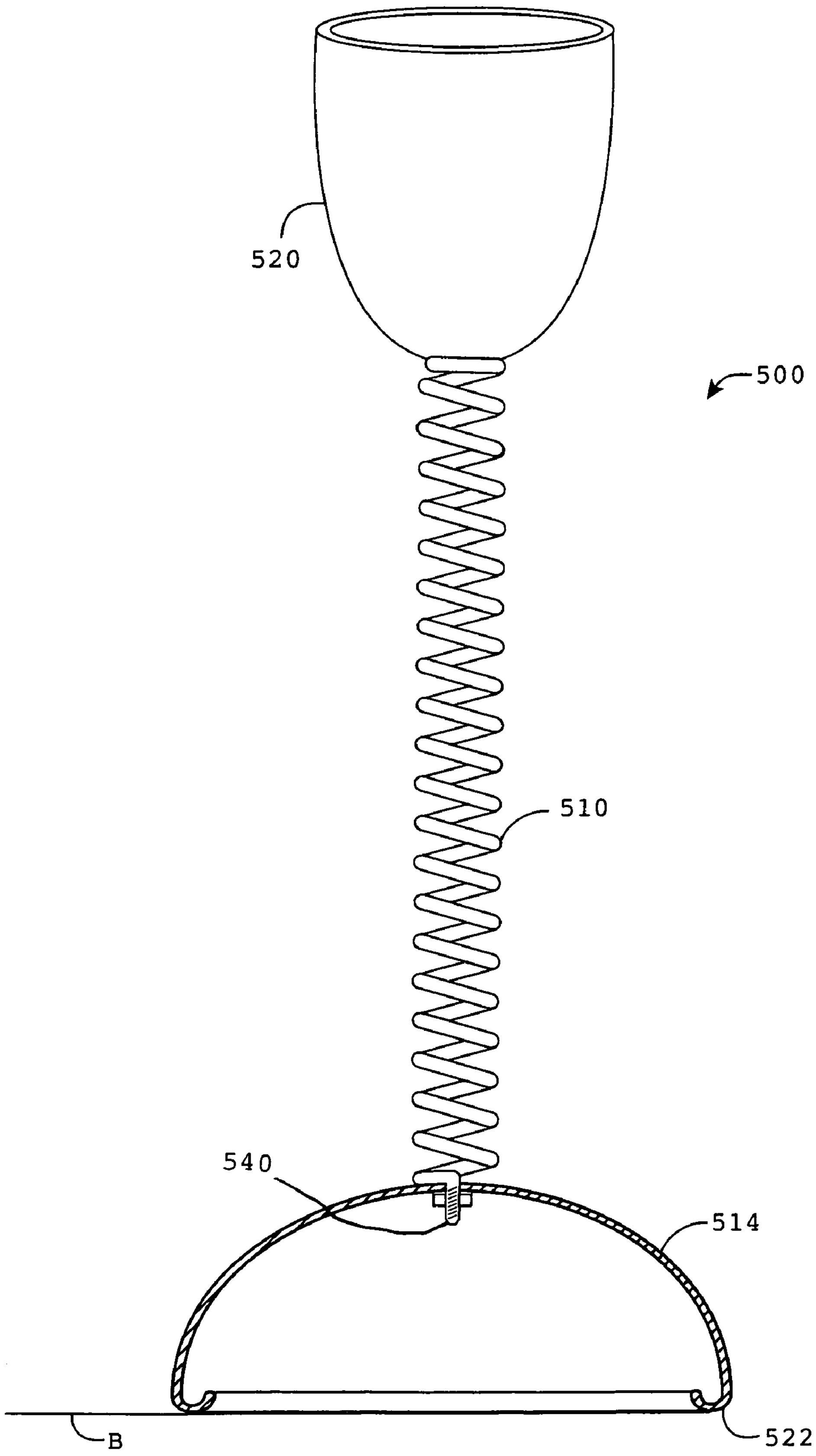
FIG. 5 shows a third embodiment.

FIG. 5 shows a third embodiment 500, a coil 510 and resonant chamber 514 shown in cross section. As can be seen the resonant chamber 514 includes a lip 522 such that the resonant chamber 514 can be held against a surface B such as the user's body or abdomen. In this way the chamber 514 can be moved in and out of contact with the surface B and thereby change the sound to create a sound effect commonly known as 'wha-wha'. The wha-wha effect is controlled by the open end of the chamber being closed and opened which in turn controls movement of air in and out of the resonator shell chamber 514 which alters the sound produced by alternately applying and releasing compression on the air and sound waves as they are emitted from the resonating shell chamber 514. The instrument 500 may be held with the length of the coil 510 approximately perpendicular to the user's body. The embodiment 500 includes a second bell resonator 520 on the other end of the coil 510. The embodiment 500 includes a coil end 540 that can pierce the resonator 514 and in this way the coil 510 can be secured even to wooden shell resonator 514 such as a coconut shell. It would also be possible to glue a coil to a coconut shell.

Figure 6:
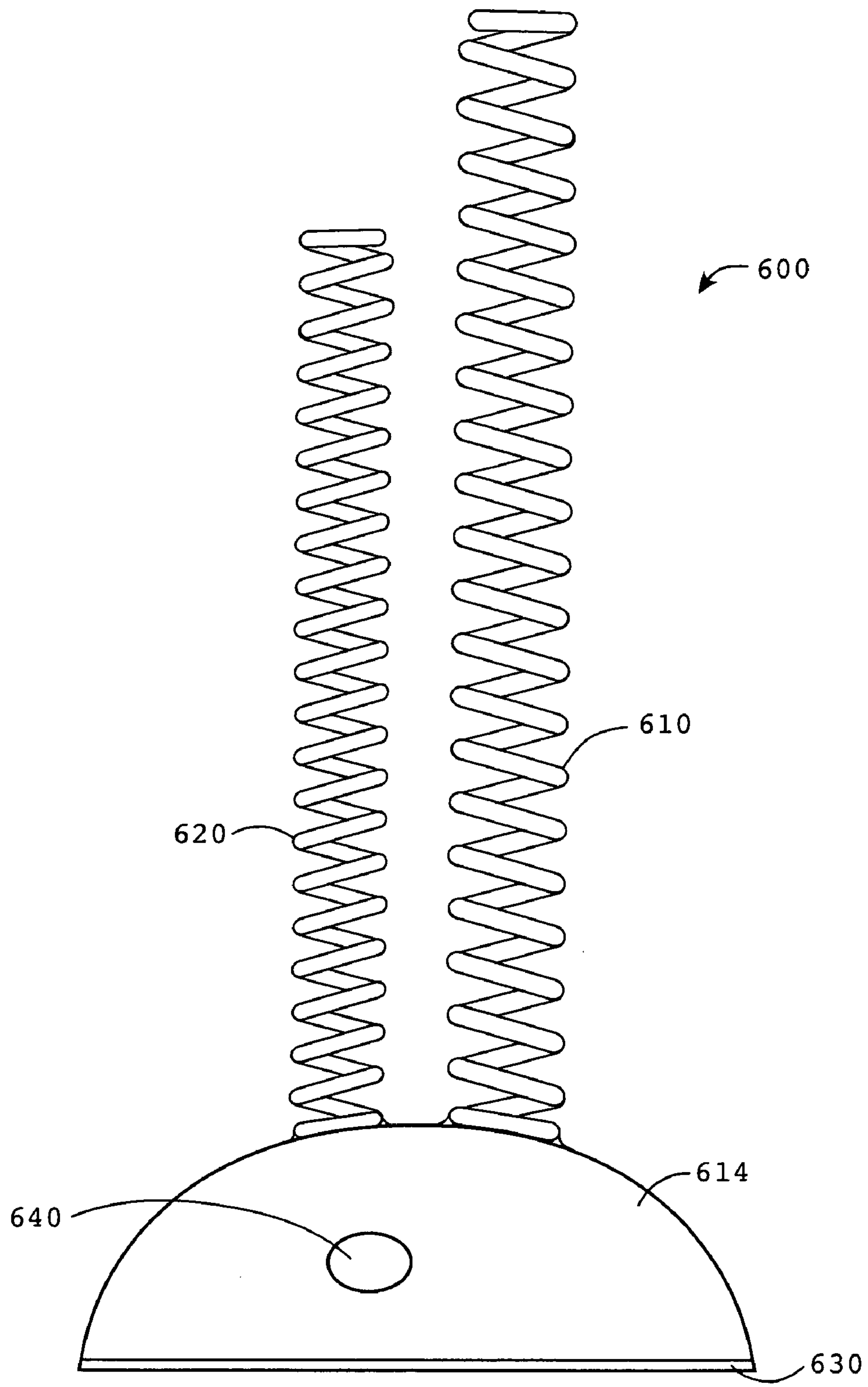
FIG. 6 shows a fourth embodiment.

FIG. 6 shows a fourth embodiment 600 with two coils 610, 620 on the resonator 614. This embodiment allows for two different sounds and either coil 610, 620 can be dampened with a finger as the other is played. The embodiment 600 includes a thin skin or plate 630 shown that covers the resonant shell 614 and makes the shell 614 closed. Once closed the shell 614 could be filled with liquid or rattle media for example. Since the length of the coil 610, 620 determines the notes the instrument 600 can be made with tuned sets of coils 610,620 of different lengths on a single resonator 614. The group 610,620 allows for musical variety that allows for matching harmonized musical qualities in a single instrument 600. Tuned sets of coils 610, 620 can also be created by progressively adjusting the stiffness or thickness of the spring coils 10. Any material and number of coils could be used.

Figure 7:
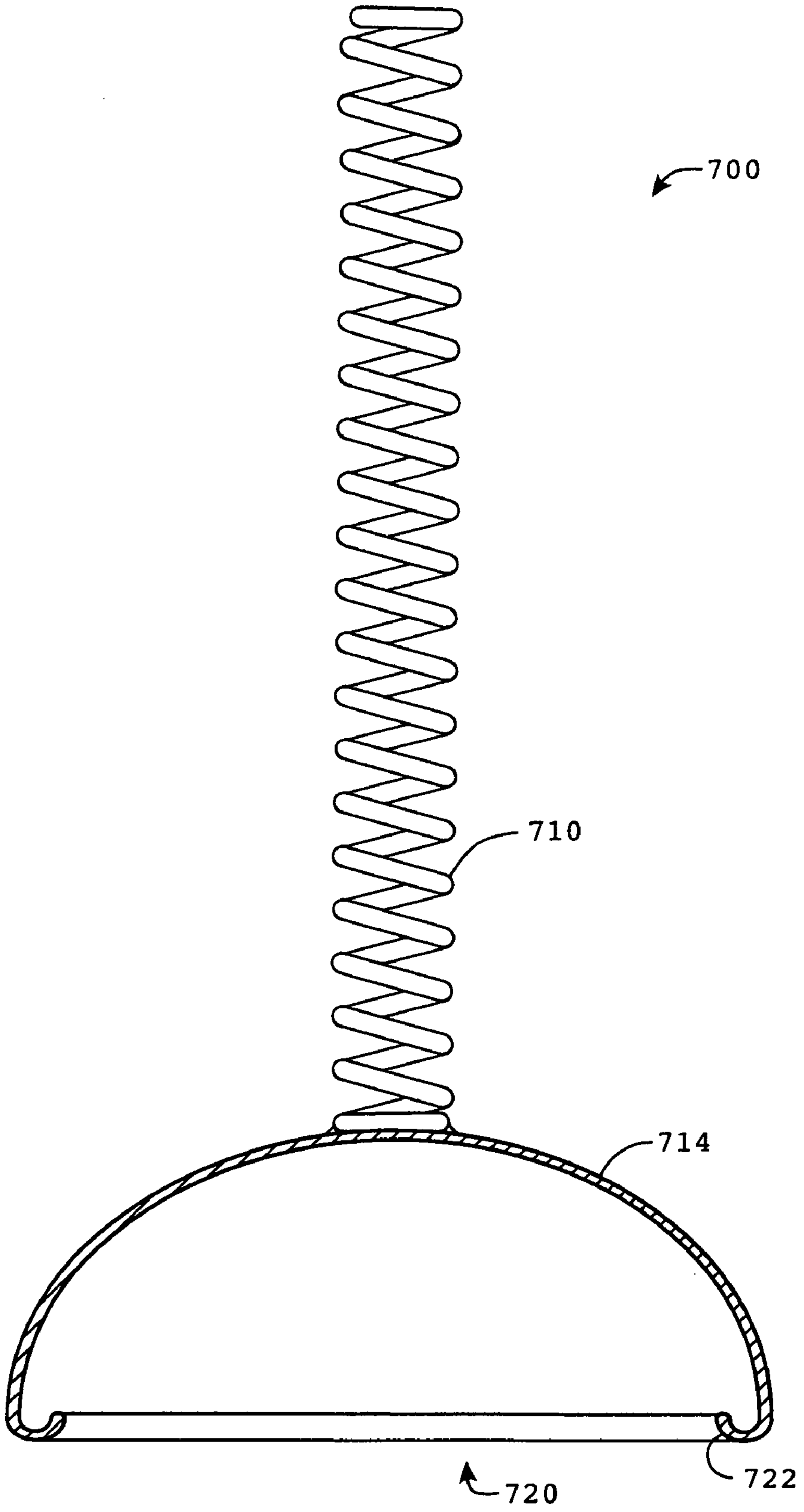
FIG. 7 shows a partial cross sectional view of a fifth embodiment.

FIG. 7 shows a fifth embodiment 700 in partial cross section. A coil 710 is attached to a resonator 714 shown in cross section. As can be seen the resonator 714 includes an opening 720 that includes a lip 722 of rolled metal to improve the ability of the resonator 714 to be held against a surface such as the body of a musician without damage or discomfort to the body. The lip 722 could have any shape and could be rolled into the resonator 714 as shown or could be rolled out or applied.

Though not shown it would be possible to build the instrument as a free standing instrument instead of one hand held. Thus the scope of the invention should be determined by the appended claims in the formal application and their legal equivalents, rather than by the examples given.

I claim:

1. A hand held percussion instrument including;

a thin walled semi-spherical resonance chamber;

a first rigid coil having a first flat end on the resonance chamber;

and the first rigid coil having a length perpendicular to the surface of the resonance chamber and;

said first coil including a plurality of individual wraps each wrap spaced from adjacent wraps; a second end of the first coil spaced from said resonance chamber such that striking the first coil produces first musical tones amplified by said resonance chamber.

2. The hand held percussion instrument of claim 1 wherein the first coil is welded to said resonance chamber.

3. The hand held percussion instrument of claim 1 wherein said resonance chamber includes at least one finger hold and one thumb hold such that said instrument can be held between a user's thumb and middle finger.

4. The hand held percussion instrument of claim 1 wherein the first coil is attached to said resonance chamber by one attachment chosen from the attachments welding, brazing or adhesives.

5. The hand held percussion instrument of claim 1 wherein said resonance chamber is a thin walled metal shell that includes an opening having a rolled lip surrounding said opening such that said opening can be held against a surface without scratching the surface and wherein said opening can be moved in and out of contact with said surface during play of the instrument to affect the musical tones of the instrument.

6. The hand held percussion instrument of claim 1 wherein said instrument includes a second coil mounted to said resonance chamber adjacent to said first coil and wherein said second coil has a different length than said first coil such that striking said second coil produces second musical tones different from said first musical tones.

7. The hand held percussion instrument of claim 1 wherein the first coil includes a second resonator attached to an end of the coil opposite said first resonator.

8. A portable percussion instrument including;

a thin walled resonance chamber;

at least a first rigid coil having a first end attached to the resonance chamber;

and the first rigid coil having a length extending from a surface of the resonance chamber and;

said first coil including a plurality of individual wraps each wrap spaced from adjacent wraps; a second end of the first coil spaced from said resonance chamber such that striking the first coil produces first musical tones amplified by said resonance chamber.

9. The portable percussion instrument of claim 8 wherein the first coil has a first flat end welded to said resonance chamber.

10. The portable percussion instrument of claim 8 wherein said resonance chamber includes at least one finger hole and one thumb hole such that said resonance chamber can be held by a user's thumb and middle finger.

11. The portable percussion instrument of claim 10 wherein the first coil is attached to said resonance chamber by one attachment chosen from the attachments welding, brazing or adhesives.

12. The portable percussion instrument of claim 10 wherein said resonance chamber is a metal shell that includes an opening having a rolled lip surrounding said opening such that said opening can be held against a surface without scratching the surface and wherein said resonance chamber can be moved in and out of contact with said surface during play of the instrument to control the musical tones of the instrument.

13. The portable percussion instrument of claim 10 wherein said instrument includes a second coil mounted to said resonance chamber adjacent to said first coil and wherein said second coil has a different musical tone than said first coil.

14. The portable percussion instrument of claim 10 wherein the first instrument includes a second resonator chamber attached to the coil.

15. A percussion instrument including;

a thin walled metal resonance chamber;

a first rigid coil having a first end attached to the resonance chamber;

and the first rigid coil mounted perpendicular to a surface of the resonance chamber and;

said first coil including a plurality of wire wraps each wire wrap spaced from adjacent wire wraps; a second end of the first coil spaced from said resonance chamber such that striking the first coil produces first musical tones amplified by said resonance chamber.

16. The percussion instrument of claim 15 wherein said resonance chamber includes at least one finger hold and one thumb hold such that said resonance chamber can be held by a user's thumb and middle finger and the user can dampen the coil with the user's index finger while holding the instrument.

17. The portable percussion instrument of claim 15 wherein said resonance chamber is a metal shell that includes an opening having a lip surrounding said opening such that said opening can be held against a surface without scratching the surface and wherein said resonance chamber can be moved in and out of contact with said surface during play of the instrument to control the musical tones of the instrument.

18. The percussion instrument of claim 15 wherein the first coil is attached to said resonance chamber by one attachment chosen from the attachments welding, brazing or adhesives.

19. The percussion instrument of claim 18 wherein said instrument includes a second coil mounted to said resonance chamber wherein said second coil has a different musical tone than said first coil.

20. The percussion instrument of claim 18 wherein the first instrument includes a second resonator chamber attached to the coil.

* * * * *